United States Patent [19]

Yasue et al.

[11] Patent Number: 5,079,727

[45] Date of Patent: Jan. 7, 1992

[54] METHOD AND APPARATUS FOR CARRYING OUT A QUALITY CONTROL

[75] Inventors: Masahiro Yasue, Musashino; Osamu Okamoto, Kaisei; Masaaki Yamaguchi, Yokohama; Noriyuki Ono, Yokohama; Yoshiteru Sunachi, Yokohama, all of Japan

[73] Assignee: Kabushiki Kaisha Komatsu Seisakusho, Japan

[21] Appl. No.: 374,457

[22] Filed: Jun. 30, 1989

[51] Int. Cl.$^5$ .............................. G06F 15/20
[52] U.S. Cl. ...................... 364/552; 364/550
[58] Field of Search ................... 364/552, 550, 551.01, 364/557, 478; 73/863.03, 863.02, 863.01, 863, 864.34

[56] References Cited

U.S. PATENT DOCUMENTS

| | | | |
|---|---|---|---|
| 3,221,152 | 11/1965 | Jones | 364/552 |
| 4,709,337 | 11/1987 | Knapp et al. | 364/552 X |

FOREIGN PATENT DOCUMENTS 60-161532 8/1985 Japan.
63-206591 8/1988 Japan.

OTHER PUBLICATIONS

"Quality Control Method and Device", Masahiro Yasue et al., PTO-91-2658 [Japan, Kokai No. 63-206591] Translated Mar. 1991, Kokai publication date 08/25/88.
"Method of Measuring Weight Carried by Vehicle", Kazuo Takagi, PTO-91-2637 [Japan, Kokai No. 60-161532] translated Mar. 1991 publication date 08/23/85.

Primary Examiner—Parshotam S. Lall
Assistant Examiner—S. A. Melnick
Attorney, Agent, or Firm—Welsh & Katz, Ltd.

[57] ABSTRACT

A system wherein raw material excavated from a plurality of pit faces on a mine are conveyed to and collected at a specific collecting location at the foot of a mountain by a plurality of vehicles and the degree of quality of collected raw material is then properly controlled at the specific collecting location is generally called a mining site control process. To practically execute such a mining control process, the degree of quality of conveyed raw material previously analyzed per each pit face and a quantity of conveyance thereof are confirmed at every time when the raw material is conveyed to the collecting location. Then, the degree of quality of raw material required to be next conveyed so as to allow the degree of quality predetermined as a target with respect to raw material to be collected is determined on the basis of the confirmed degree of quality and quantity of conveyance, and the manner of operating the respective vehicles is determined on a real time base so as to allow the thus determined degree of quality to be realized. When such a manner of operating the vehicles is to be determined, the most effective arrangement is selected for them in view of the representative state of actual operations of the vehicles and their loading capacity. All information in relation to such a mining site control process are electrically processed using a variety of sensors arranged at the respective pit faces and the collecting location, a computer installed in a control center and the like means.

8 Claims, 6 Drawing Sheets

METHOD AND APPARATUS FOR CARRYING OUT A QUALITY CONTROL

BACKGROUND OF THE INVENTION

1. Field of the Invention

The present invention relates to a method and an apparatus for assuring quality control wherein a degree of quality of raw material is properly controlled, e.g., when cement is produced in accordance with a so-called mining site control process, while rocks of limestone excavated from a plurality of pit faces on a mine are collected at a specific collecting location at the foot of a mountain.

2. Description of the Related Art

To facilitate understanding of a conventional quality control, the aforementioned mining site quality control process employed when cement is produced will be described below with reference to its current state.

As is well known, arrangement of $CaCO_3$ constituting a main component of limestone usable as raw material when cement is produced becomes a significant problem for the purpose of maintaining good quality control.

Usually, rocks of limestone are excavated from a plurality of pit faces on a mine in such a manner that limestone rocks having a content of $CaCO_3$ more than 92% are excavated from several pit faces and other limestone rocks having a content of $CaCO_3$ of about 5% are excavated from the remaining pit faces. These excavated rocks are conveyed by a plurality of dumptrucks to a specific collecting location (in the form of a shaft) at the foot of a mountain, whereby arrangement of $CaCO_3$ is made in an optimum manner by mixing them at the collecting location. To assure that a certain degree of quality predetermined as a target with respect to rocks mixed at the collecting location (in the shaft) is maintained for the production of cement (usually, 92% represents a preferable degree of quality for production of cement), i.e., rocks to be mixed with each other are collected at a specific rate for maintaining the target degree of quality, the following steps have been hitherto performed to improve accuracy in relation to the mining site control process.

These steps will be noted below.

(1) Before conveying operations are performed by dumptrucks (usually, at a day before the conveying operations), limestone rocks (comprising rocks having a higher content of $CaCO_3$ and rocks having a lower content of the same) are excavated from the respective pit faces using drilling machines and their powders obtained by drilling operations are chemically analyzed to determine their degree of quality. This is intended to clarify a relationship between each pit face (excavating location) and grade of quality of limestone excavated therefrom.

(2) Then, (usually, at the same day as the conveying operations) a plan for operating respective dumptrucks is settled with reference to the thus determined degree of quality of rocks excavated from each pit face (in many cases, plural kinds of dumptrucks of which loading capacity is different from each other are operated).

(3) While a time of movement of the dumptrucks to loading locations (pit faces) and a shaft (dumping pit) and the number of dumping operations are properly controlled in accordance with the settled operation plan, rocks excavated from the respective pit faces are collected in the shaft. Such controlling is effected via wireless communication between one vehicle in which a person in charge of calculation rides and other vehicles. For example, a notice "No. 1 dumptruck and No. 3 dumptruck should move toward No. 1 pit face and No. 2 pit face where rocks having a higher content of $CaCO_3$ are excavated. In the meantime, No. 2 dumptruck should convey rocks having a lower content of the same in No. 3 pit so that they are dumped in the shaft." is issued from the person.

(4) Each vehicle is equipped with two manually operable counters in its cabin allocated to the respective loading locations (one of them being provided for rocks having a higher content of $CaCO_3$ and the other one being provided for rocks having a lower content of $CaCO_3$). Each time loaded rocks are dumped in the shaft, an operator in each vehicle manually actuates one of the counters which corresponds to the content of rocks. Values derived from the counters in that way are later summed so that they are used for the purpose of periodic quality control for rocks dumped in the shaft and confirmation of operations performed by the dumptrucks, e.g., per day in unit.

(5) Rocks dumped in the shaft (collecting location) are extracted from the middle part of the latter so that they are crushed by a crusher. Crushed rocks are then sieved under the influence of vibration and fine rocks each having an adequate grain size are conveyed to a cement factory via a belt conveyor. It should be noted that a predetermined quantity of fine rocks are subjected to sampling at a constant time interval (usually, every seven minutes and thirty seconds). Further, the rocks which have been collected by sampling are chemically analyzed at a constant time interval (usually, every two hours and thirty minutes to three hours) to confirm the result derived from adjustment of the content of $CaCO_3$.

With such quality control, it is possible to maintain a degree of quality of collected rocks to some extent with certainty, particularly in response to the accuracy set by the above operation plan. In practice, however, it is very complicated to prepare an operation plan itself, because the latter requires a number of elaborate calculations. Thus, it is difficult to prepare such an operation plan with high accuracy.

With respect to a quantity of conveyance for rocks to be handled in accordance with the operation plan, a fixed value set with a standard loading capacity for each vehicle used as a reference is employed (e.g., in case of a dumptruck having a loading capacity of 35 tons, its quantity of conveyance is always set to 35 tons and in case of a dumptruck having a loading capacity of 70 tons, its quantity of conveyance is likewise always set to 70 tons). Accordingly, as a conveying operation progresses, there arises a problem that a value representative of the degree of quality of collected rocks involves error which gradually increases.

Thus, quality control can not be carried out to the extent expected, in spite of the fact that the operation plan has been prepared with much difficulty. Further, it is practically difficult to adjust execution of the quality control.

Additionally, with the conventional controlling method, wireless communication between vehicles is required. Another troublesome problem is that confirmation of completion of the noticed conveying operation (i.e., actuation of the aforementioned counters) is entrusted to operators for the respective vehicles. If actuation of the counters is forgotten or neglected, periodic data derived from execution of quality control becomes meaningless.

These problems arise not only in case of production of cement but things are almost same with a method of adjusting arrangement of collected raw material and executing quality control for the latter in accordance with the mining site control process.

SUMMARY OF THE INVENTION

The present invention has been made with the foregoing background in mind and its object resides in providing a method and an apparatus for carrying out quality control procedures which assure that the quality control can easily and exactly be executed at a high efficiency for collected raw material in accordance with a so-called mining site control process without any particular duty imparted to an operator for each vehicle.

According to the present invention, when raw material excavated from a plurality of pit faces is conveyed to a specific collecting location by a plurality of vehicles, a manner of operating the vehicles is determined on a real time base with reference to a degree of quality previously analyzed for the respective pit faces with respect to the raw material already conveyed thereby, a quantity of actual conveyance of the raw material and a degree of quality of raw material predetermined as a target so as to allow a degree of quality of raw material at the collecting location to be maintained at the level site as a target.

Further, according to the present invention, the state indicative of movement of each vehicle is held on the real time base and also the manner of operation of the same at an arbitrary time is determined on the real time base in response to the collected information. This makes it possible to eliminate the troublesome and time-consuming work required for preparation of an operation plan for the respective vehicles with the result that a target degree of quality of collected raw material can be maintained easily and its adjustment can be achieved also easily.

Since the target degree of quality of collected raw material can be maintained easily and its adjustment can be achieved easily and exactly in that way, the adjustment work in relation to sampling and analyzing for the collected raw material in the course of a collecting operation can be eliminated or its frequency can be reduced.

BRIEF DESCRIPTION OF THE DRAWINGS

The present invention is illustrated by way of example in the following drawings in which.

DESCRIPTION OF THE PREFERRED EMBODIMENT

Now, the present invention will be described in detail hereinafter with reference to FIGS. 1 to 5 which illustrate an apparatus for carrying out quality control procedures in accordance with an embodiment of the present invention.

Also in this embodiment, a large quantity of rocks of limestone excavated from a plurality of pit faces in a mine are carried by a plurality of vehicles (dumptrucks) so that they are collected in a collecting location (in the form of a shaft) at the foot of a mountain in the same manner as mentioned hereinbefore. To assure that a quality of collected rocks usable as raw material for production of cement is maintained at a required level by adjusting a grade of quality of excavated rocks at the mining sites before they are delivered to a cement factory, quality control procedures are carried out. Here, the present invention is directed to a method and an apparatus for carrying out quality control procedures in accordance with a so-called mining site control process. In the illustrated embodiment, it is assumed that different kinds of rocks (of limestone) are excavated from three pit faces and they are then carried to a single shaft using four dumptrucks of which standard loading capacity is rated to two classes.

Figure 1:
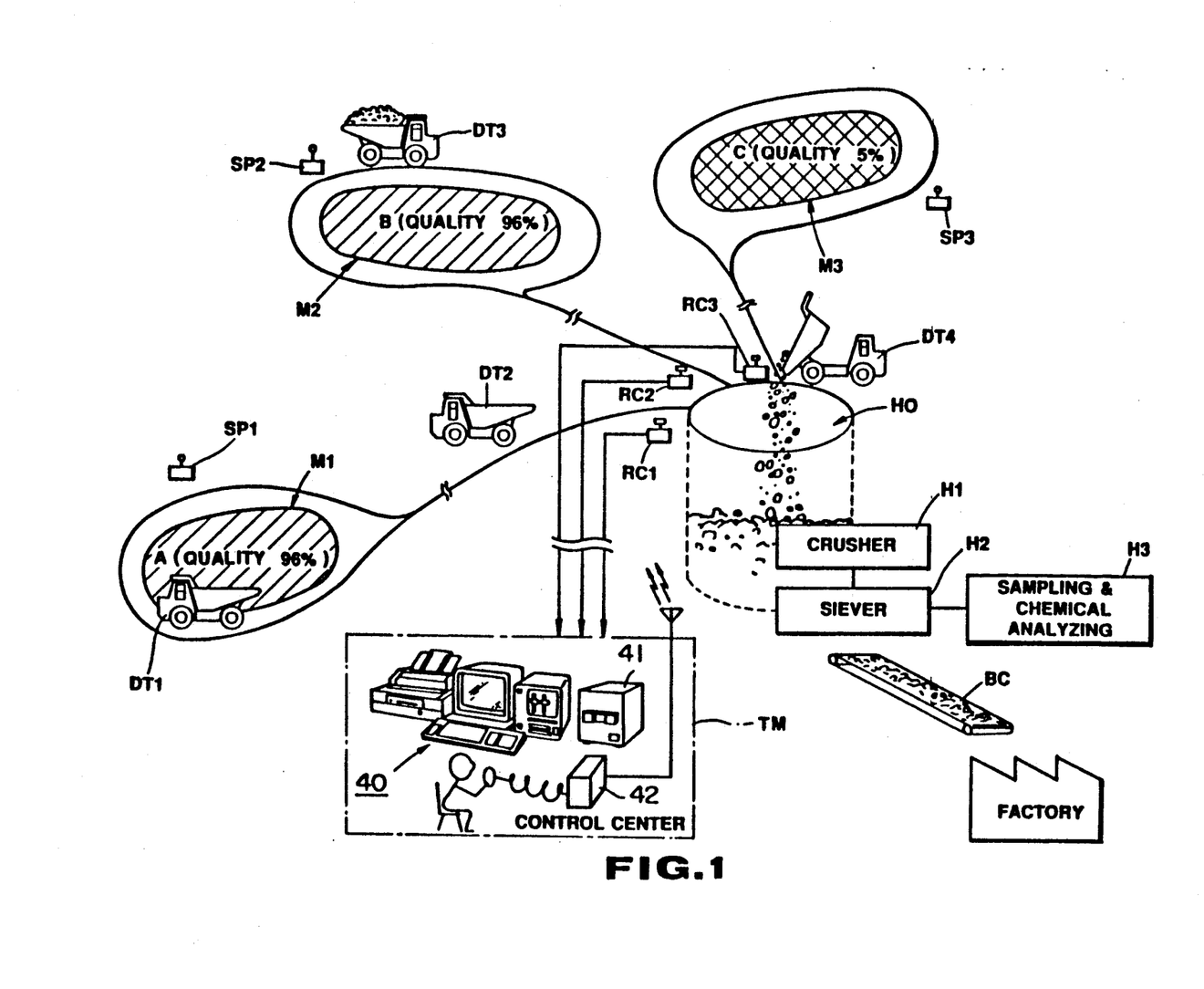
FIG. 1 is a schematic view illustrating the background and outline representative of a method and apparatus for carrying out quality control procedures in accordance with an embodiment of the present invention.

FIG. 1 schematically illustrates a relationship among an apparatus of the present invention, three mining sites and a shaft in which excavated rocks are collected. In the drawing, reference symbols M1, M2 and M3 designate three pit faces in a mine from which different degrees of quality of limestone rocks are excavated, reference symbols DT1, DT2, DT3 and DT4 represent four dumptrucks for conveying excavated rocks, reference symbol HO represents a shaft at the foot of a mountain in which conveyed rocks are collected, reference symbols SP1, SP2 and SP3 represents sign posts (each representative of a ground station at a loading site) arranged in correspondence to loading stations for the pit faces M1, M2 and M3 to supply each dumptruck with optical information concerning the relevant pit face (hereinafter referred to as pit face information to be described later) using a suitable light emitter, and reference symbols RC1, RC2 and RC3 represent receiving stations (each representative of a ground station at a dumping site) arranged in correspondence to a plurality of dumping sites (three dumping sites in the illustrated case) located in the proximity of the shaft HO to receive optical information provided by each dumptruck via a suitable light emitter (the content of information is hereinafter referred to as conveyance information to be described later) and transfer the received conveyance information with discriminating information indicative of the position of a dumping site added thereto (the combined information are hereinafter referred to as collected information) to a data processing unit 40 in a control center TM using either wire communication or wireless communication.

Incidentally, the data processing unit 40 in the control center TM includes a computer to obtain data concerning a grade of quality of whole rocks collected in the shaft HO and a quantity of the same from transferred information on a real time base at every time when the collected information are transferred thereto (a manner of obtaining data and the content of the latter will be described in detail later) and moreover obtain data at least data concerning a degree of quality of collected rocks and a quantity of the same periodically (e.g., per day in unit) on the basis of information read from an IC card reader 41 adapted to automatically read information stored in an IC card to be described later (a manner of obtaining data will be also described in detail later). In addition to the IC card reader 41, the control center TM is equipped with a wireless unit 42 for communicating with the respective dumptrucks DT1 to DT4.

Further, for the convenience of easy understanding, reference symbols HI to H3 in FIG. 1 illustrate by way of a flowchart a series of steps of finely crushing limestone rocks with the use of a crusher, sieving and sampling the crushed rocks at the middle part of the shaft HO (refer to No. 5 step in the conventional mining site control process as mentioned hereinbefore). After completion of operations of fine crushing and sieving, granular rocks having an adequate grain size are conveyed to a factory via a belt conveyer as shown in FIG. 1.

Figure 2:
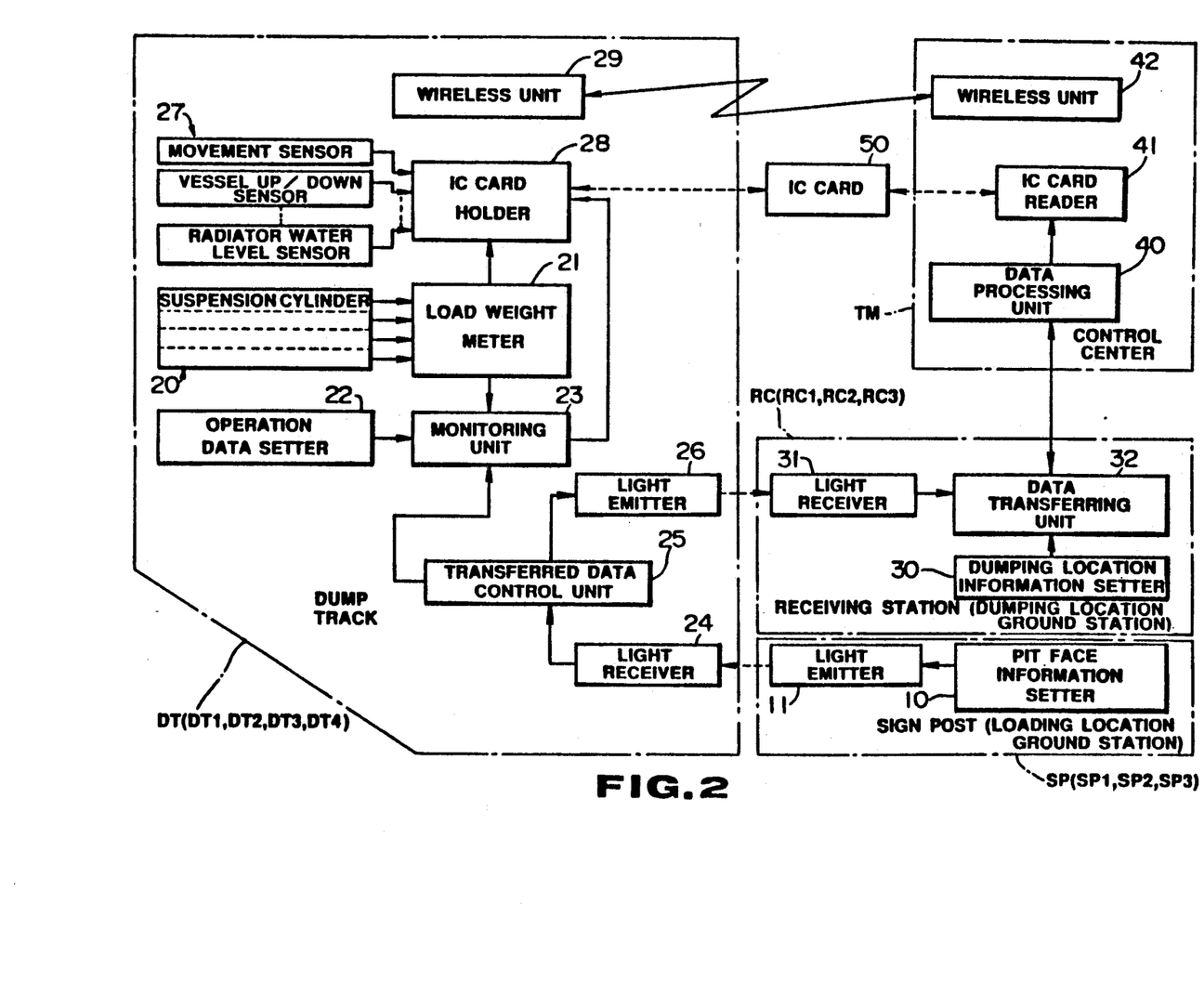
FIG. 2 is a block diagram illustrating a concrete construction of the apparatus in accordance with the embodiment of the present invention.

FIG. 2 is a block diagram concretely illustrating an electrical arrangement for the apparatus in accordance with the embodiment of the present invention constructed with the background shown in FIG. 1 in mind. Functions and operations of respective sections will be hereinafter described in detail with reference to FIG. 2.

First, each of the sign posts SP (SP1, SP2 and SP3) arranged at rock loading sites for the respective pit faces M1 to M3 as ground stations comprises a pit face information setter 10 in which information concerning each pit face are preset and registered and a light emitter 11 for emitting light while the registered pit face information are converted into optical information in the form of, e.g., infrared rays.

Here, it is assumed that each pit face information comprises a discriminating information (discriminating code) for making discrimination as to what pit face is identified among M1 to M3 and a quality information representative of a grade of quality of rocks excavated from the relevant pit face. As mentioned above, the degree of quality of rocks (i.e., content of $CaCO_3$) is determined on the basis of results derived from chemical analyzation of limestone powder which has been performed for each pit face before the quality control procedure is carried out. Each value indicative of the determined degree of quality is set and registered as a quality information in the pit face information setter together with a discrimination information for the relevant pit face. In the illustrated case, it is assumed that as shown in FIG. 1, rocks A excavated from the pit face M1 has a content of 96% of $CaCO_3$, rocks B excavated from the pit face M2 has a content of 96% of $CaCO_3$ and rocks C excavated from the pit face M3 has a content of 5% of $CaCO_3$ and that values representative of these degree of quantity and discriminating codes individually representing the pit faces M1 to M3 are registered as pit face information in the pit face information setter 10 for the relevant sign post.

Further, it is assumed that the light emitter 11 converts the thus set and registered pit face information into optical information so as to allow the latter to be delivered with a predetermined directionality to a passage region for the dumptruck DT (DT1 to DT4) at each loading site.

Figure 3:
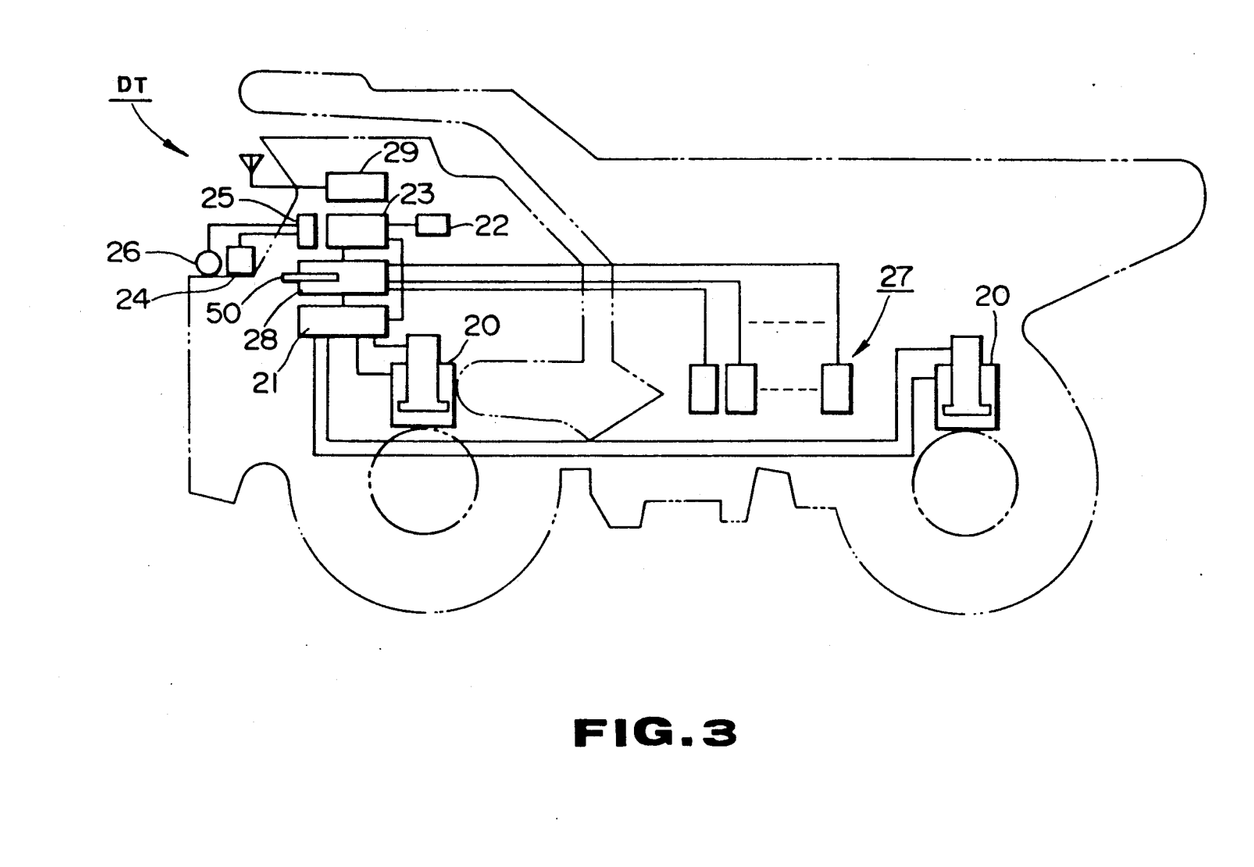
FIG. 3 is a schematic view illustrating a manner of mounting the apparatus in accordance with the embodiment of the present invention on a dumptruck.

As schematically shown in FIG. 3, each dump truck DT (DT1, DT2, DT3, DT4) adapted to receive as a first relay station pit face information from the sign post SP (SP1, SP2, SP3) at the loading site for each pit face is provided with four suspension cylinders 20 arranged in correspondence to the four wheels on a vehicle to support the weight of the latter, a load meter 21 for measuring the actual weight of rocks loaded on the vehicle (hereinafter referred to simply as load) on the basis of pressure in the interior of each suspension cylinder 20 and other parameters, an operation data setter 22 having a variety of data concerning operation of the vehicle such as a vehicle number, a number given to an operator riding on the vehicle, a quantity of supplemented fuel, a date of working day or the like data inputted thereto via the operator, a monitoring unit 23 for visually representing by adequate operation of an operator required information among the information measured by the load meter 21 concerning the weight of a load put on the vehicle (hereinafter referred to as weight data), various operation data manually inputted via the operation data setter 22 and pit face information received via a light receiver 24 and a transferred data control unit 25 to be described later while the foregoing information are temporarily stored therein, a light receiver 24 adapted to optically receive optical information from each light emitter 11, i.e., pit face information when the vehicle reaches a light emitting directional region of the light emitter 11 arranged at the sign post SP and then convert them into electrical information, a transferred data control unit 25 in which pit face information received by the light receiver 24 are temporarily stored, their content is transferred to the monitoring unit 23, the content of vehicle number information and weight information among information stored in the monitoring unit 23 is taken with the content of pit face information added thereto so as to allow information representative of the content of conveyance carried out by the vehicle, i.e., conveyance information to be newly formed and maintained and the maintained information are then individually outputted as data to be transferred outside of the vehicle, a light emitter 26 for emitting light with a predetermined directionality while conveyance information outputted from the control unit 25 are converted into optical information in the form of, e.g., infrared rays, a group of sensors 27 for detecting a vehicle movement speed, a distance of movement of each vehicle, a manner of operating a vessel of the vehicle and an operational state of the vehicle varying during movement of the latter as time elapses, an IC card holder 28 designed to have an IC card 50 to be described later removably attached thereto so that weight information measured via the weight meter 21, various operation data in relation to vehicle number, operator number or the like stored in the monitoring unit 23 and pit face information (most of these information constituting conveyance information relative to the vehicle) are transferred to and stored in a memory incorporated in the IC card 50 at every time of one operation cycle of the vehicle (to be performed in the order of "rock dumping", "movement", "loading", "movement" and "rock dumping") on the basis of an output from the sensor, e.g., the sensor for detecting a manner of operating the vessel, among the group of sensors and latch data are successively transferred to and stored in a predetermined region of the memory incorporated in the IC card 50 while outputs from the group of sensors 27 are individually latched in accordance with a predetermined time base, and a wireless unit 29 for enabling a wireless unit 42 arranged in the control center TM to have a talk therewith (to make a communication therewith) via an operator.

Here, the weight meter 21 inclusive of the suspension cylinders 20 is such that the weight of a load put on the vehicle is measured in accordance with, e.g., a method of measuring the weight of a load put on a vehicle disclosed in a patent application filed by the same applicant as that of the present invention under Japanese Patent Application No. 17,528/1984.

The operation data setter 22 is so constructed that pit face information are manually inputted in addition to information concerning operations of the vehicle. Thus, e.g., in case where an abnormality such as failure of the sign post SP and the light emitter 24 or the like malfunction occurs, pit face information can be transmitted to the monitoring unit 23 via the operation data setter 22 and then to the transferred data control unit 25 via the monitoring unit 23.

Figure 4:
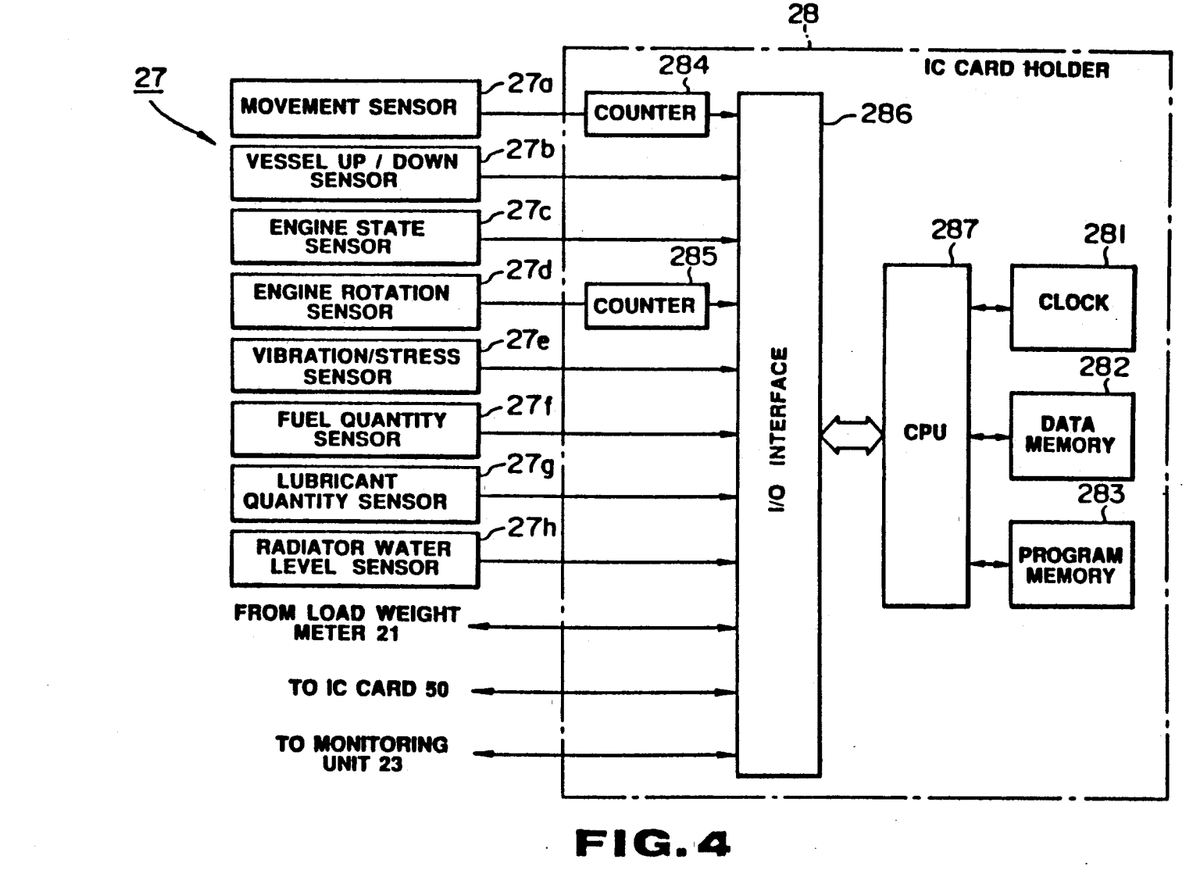
FIG. 4 is a block diagram illustrating a concrete construction of an IC card holder employable for the apparatus in accordance with the embodiment of the present invention.

A relationship of the group of sensors 27 to the IC card holder 28 and a relationship of the weight meter 21, the monitoring unit 23 and the IC card 50 to the IC card holder 28 can be represented in such a manner as shown in FIG. 4.

As mentioned above, the group of sensors 27 are intended to detect the operational state of the vehicle that varies during movement of the latter as time elapses. As one example of the group of sensors 27, a sensor 27a is a movement sensor arranged on a shaft operatively associated with wheels of the dumptruck to output the number of electrical pulses in proportion to a rotational speed of the shaft, i.e., a movement speed of the dumptruck itself, a sensor 27b is a vessel raising/-lowering sensor for normally watching a position assumed by the vessel of the vehicle to output a high level signal, e.g., at a logic level when the vessel is raised up and output a low level signal, e.g., at the logic level when the vessel is lowered (this sensor is used as a cycle discriminating sensor), a sensor 27c is an engine state sensor for normally watching an ON/OFF state of the engine to output a high level signal, e.g., at a logic level when it assumes an ON state and output a low level signal, e.g., at the logic level when it assumes an OFF state, a sensor 27d is an engine rotation sensor arranged on the shaft of the engine or the like component to output the number of electrical pulses corresponding to the number of revolutions of the engine, a sensor 27e is a vibration/stress sensor arranged on a chassis of the dumptruck or the like component which is often influenced by vibration or stress to output an electrical signal corresponding to a magnitude of vibration or stress appearing at the foregoing components during operation of the dumptruck, a sensor 27f is a remaining fuel quantity sensor for detecting a quantity of remaining fuel at an ON or OFF state assumed by the engine to output a suitable signal corresponding to the quantity of remaining fuel (it is assumed that when a detected signal is output in the form of an analog signal, it is converted into a digital signal before it is output), a sensor 27g is a remaining lubricant quantity sensor for detecting a quantity of various remaining lubricants in the same manner as the remaining fuel quantity sensor 27f, and a sensor 27h is a radiator water level sensor for detecting the level of water in a radiator in the same manner as the remaining fuel quantity sensor 27f or the remaining lubricant quantity sensor 27g. While only eight kinds of main sensors are shown and illustrated in the drawing, it should of course be understood that more precise control can practically be carried out by adding other sensors (e.g., a batter liquid quantity sensor, a temperature sensor or the like). In contrast with the foregoing, the number of sensor may be reduced so as to allow items to be controlled to be restricted. It should be noted that in the following description, data extracted from the aforementioned eight kinds of sensors are used as operating data for each dumptruck for which the apparatus in accordance with the illustrated embodiment is utilized.

As shown in FIG. 4, for allowing output from the aforementioned group of sensors 27 to be processed correctly, the IC card holder 28 includes a clock 281 adapted to output predetermined time data indicative of the current time or the like, a data memory 282 comprising a semiconductor memory such as RAM or the like, a program memory 283 comprising a semiconductor memory such as ROM or the like in which a predetermined program to be executed by the IC card holder 28 is stored as program data, counters 284 and 285 for counting the number of electrical pulses output from the movement sensor 27a and the engine rotation sensor 27d, an I/O interface 286 for allowing a variety of information to be transmitted from the monitoring unit 23 to the IC card 50 and vice versa while they receive output derived from calculations of the counters 284 and 285, output derived from detection of the vessel raising/lowering sensor 27b, the engine state sensor 27c, the vibration/ stress sensor 27e, the remaining fuel quantity sensor 27f, the remaining lubricant quantity sensor 27g and the radiator water level sensor 27h and weight information outputted from the weight sensor 21, and a CPU 28 adapted to centrally control various operations to be performed as an IC card holder on the basis of program data stored in the program memory 283 such that output derived from calculations of the counters 284 and 285 and output derived from the respective sensors 27d (exclusive of the movement sensor 27a and the engine rotation sensor 27d) to be inputted into I/O interface 286 are transferred to and stored in a memory incorporated in the IC card 50 fitted to the IC card holder 28 via the I/O interface 286 in accordance with a predetermined time base while they are latched on the basis of time data output from the clock 281 and weight information derived from the weight meter 21 to be received in the I/O interface 286, various operation data stored in the monitoring unit 23 and pit face information are transferred to and stored in the memory in the IC card 50 together with the time data via the I/O interface 286 at every time when a single operation cycle has been completed with the vehicle which is discriminated on the basis of detection output from the vessel raising/-lowering sensor 27b.

The wireless unit 29 mounted on the dumptruck DT is a hitherto known wire less unit which is generally employed for a wire less communication.

As shown in FIG. 2, each of the receiving stations RC (RC1, RC2 and RC3) arranged as second relay stations at rock dumping sites in the proximity of the shaft HO (see FIG. 1) includes a dumping site information setter 30 in which discriminating information representative of the position of a dumping site position where the latter is located) are preset and registered, a light receiver 31 for receiving conveyance information issued from the light emitter 26 as optical information to convert them into electrical signals when the dumptruck DT reaches the position of the dumping site and thereby the directional region of the light emitter 26 becomes its own directional region, and a data transferring unit 32 for forming collected information by adding discriminating information previously registered in the dumping site information setter 30 to conveyance information optically received by the light receiver 31 and automatically transferring the collected information to the control center TM.

Figure 5:
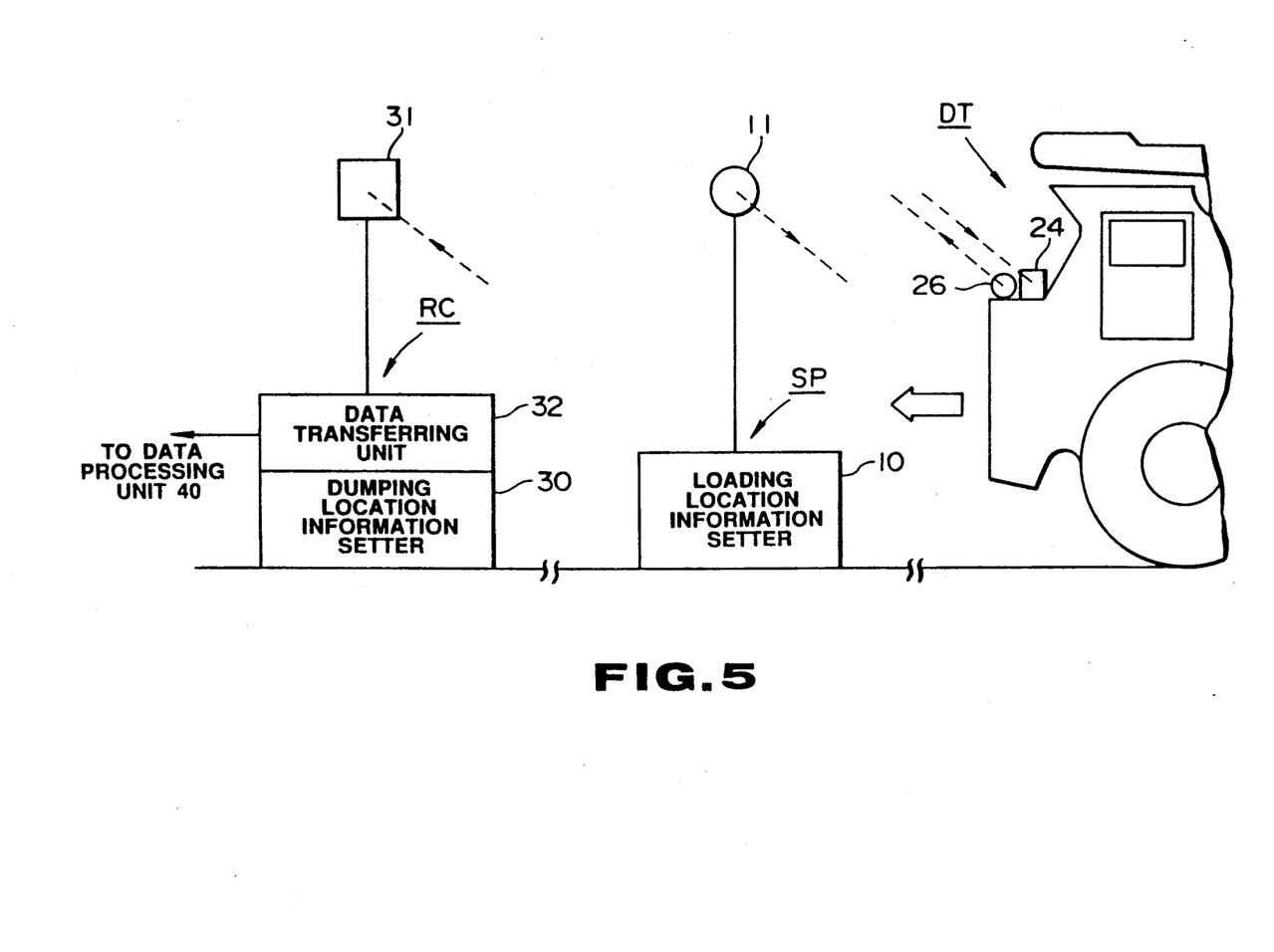
FIG. 5 is a schematic view illustrating a manner of sending and receiving optical information for the apparatus in accordance with the embodiment of the present invention.

Next, a manner of allowing information having light (infrared rays in the illustrated case) used as a medium to be transmitted between the sign post SP serving as a supply station for supplying pit face information, the dumptruck DT serving as a first relay station for the pit face information (exactly speaking, to add vehicle number information and weight information to the pit face information to relay them as conveyance information) and a receiving station RC serving as a second relay station (exactly speaking, to add dumping site discriminating information to the conveyance information inclusive of the pit face information to relay them as collected information) is schematically illustrated in FIG. 5.

By sending and receiving information using light as a medium in that way, required information can exactly be transmitted even under a bad environment such as a mining site or the like. Incidentally, the light receiver 24 and the light emitter 26 mounted on respective dumptrucks have their directional regions which are arranged in such a manner as to correspond to a directional region of the light emitter 11 in the sign post SP and a directional region of the receiver 31 in the receiving station RC. This assures that no interference occurs with the light receivers 24 and the light emitters 26 mounted on dumptrucks when the latter pass by each other or one dumptruck passes another ahead.

Since collected information formed in the receiving station RC to be transferred from the latter to the control center TM represent combined information comprising pit face information (a pit face discriminating information + a quality information), a vehicle number information given to a dumptruck for conveying rocks excavated from a pit face, a weight information indicative of a quantity of rocks loaded on the vehicle and dumping site discriminating information indicative of the positions of dumping sites in the proximity of the shaft where rocks are dumped, the data processing unit 40 in the control center TM adapted to receive the collected information can hold the following items on the real time base at every time when the collected information are transferred.

(a) Does what vehicle convey rocks?
(b) From what pit face are rocks conveyed?
(c) How high degree of quality do conveyed rocks have?
(d) How much quantity of rocks are conveyed?
(e) To what dumping site are rocks conveyed?

After the data processing unit 40 has collected such information in that way, it controls the degree of quality of rocks collected in the shaft HO, for example, by executing the following calculations.

Specifically, at every time when the collected information are transferred, a quantity of added rocks C required to maintain a predetermined target degree of quality (e.g., representative of 92 ~ of $CaCO_3$ content) is calculated from a quantity of rocks (A, B) and a quantity of conveyed rocks both of which are represented by the collected information. When it is found that a value derived from the calculation is a value near to a standard load to be conveyed by one of the dumptrucks DT1 to DT4, a notice is given to a certain dumptruck DT so as to allow the latter to convey rocks (C) to the shaft HO and dump them therein.

Now, it is assumed that the collected information represent, e.g., the following items.

(a) The dumptruck DT3 (No. 3 vehicle) has conveyed rocks.
(b) Rocks (B) are excavated from the pit face M2.
(c) The excavated rocks (B) have a degree of quality of 96%.
(d) 70 tons of rocks (B) are excavated.
(e) They have been conveyed to a dumping site at which the receiving station RC2 is installed.

Then, the data processing unit 40 calculates from the degree of quality of rocks B (96%) and the quantity of conveyed rocks based on the following equation that 67.2 tons of $CaCO_3$ in net quantity are to be dumped.

$$0.96 \times 70 \text{ (tons)} = 67.2 \text{ (tons)}$$

Next, a quantity of rocks C required at this time point is calculated on the basis of the following equation to reach the target quantity (92%).

$$67.2 \text{ (tons)}/(70 \text{ (tons)} + x \text{ (tons)}) = 0.92$$

where x represents a required quantity of rocks C. In the foregoing case, a required quantity of rocks (C) is obtained in the following manner.

$$x = 3.04 \text{ (tons)}$$

The data processing unit 40 repeatedly executes the aforementioned calculations at every time when collected information are transferred thereto, and when it is found that a total value indicative of the required quantity x of rocks C reaches, e.g., about 35 tons, it provides notice that rocks C should be conveyed by other vehicle of which standard loading capacity is rated to 35 tons and dumped in the shaft HO.

In response to the notice from the data processing unit 40 (the notice may be such that values derived from the aforementioned calculations are represented via a display (not shown)), an operator in the control center TM controls arrangement of the respective vehicles via the wireless unit 42.

The following table shows by way of example a manner of processing various data using the data processing unit 40 on the assumption that each rock to be conveyed and dumped in that way has a grade of quality as shown in FIG. 1 (i.e., grade of quality of rocks A = 96%, grade of quality of rocks B = 96% and grade of quality of rocks C = 5%), a target grade of quality is set to 92% as mentioned above, No. 1 and No. 2 dumptrucks represented by DT1 and DT2 have a loading capacity of 35 tons and No. 3 and No. 4 dump trucks represented by DT3 and DT4 have a loading capacity of 70 tons.

tained along a line of 92% representative of a target degree of quantity.

TABLE

| dumping operation number | vehicle number | summed quantity of dumped rocks (tons) | required quantity of rocks C (tons) | final grade of quality (%) | quantity of CaCO$_3$ (tons) | remarks |
|---|---|---|---|---|---|---|
| 111 | 1 | 5425 | 29.77 | 92.5 | 5017 | notice |
| 112 | 3 | 5495 | 32.99 | 92.5 | 5084 | of conveyance of rocks C to No. 2 vehicle |
| 113 | 2 | 5530 | −2.01 | 92.0 | 5086 | dumping of rocks C |
| 114 | 4 | 5600 | 1.21 | 92.0 | 5153 | notice |
| 115 | 1 | 5635 | 2.82 | 92.0 | 5187 | of conveyance |
| 116 | 2 | 5670 | 4.43 | 92.1 | 5220 | of rocks C to |
| 117 | 3 | 5740 | 7.65 | 92.1 | 5287 | No. 1 vehicle |
| 118 | 4 | 5810 | 10.87 | 92.2 | 5355 | |
| 119 | 1 | 5845 | 12.48 | 92.2 | 5388 | |
| 120 | 2 | 5880 | 14.09 | 92.2 | 5422 | |
| 121 | 3 | 5950 | 17.30 | 92.3 | 5489 | |
| 122 | 1 | 5985 | 18.91 | 92.3 | 5523 | |
| 123 | 4 | 6055 | 22.12 | 92.3 | 5590 | |
| 124 | 2 | 6090 | 23.74 | 92.3 | 5623 | |
| 125 | 1 | 6125 | 25.35 | 92.4 | 5657 | |
| 126 | 2 | 6160 | 26.96 | 92.4 | 5691 | |
| 127 | 3 | 6230 | 30.18 | 92.4 | 5758 | |
| 128 | 4 | 6300 | 33.40 | 92.5 | 5825 | |
| 129 | 1 | 6335 | −1.60 | 92.0 | 5827 | dumping of rocks C |
| 130 | 2 | 6370 | 0.01 | 92.0 | 5860 | notice |
| 131 | 3 | 6440 | 3.23 | 92.0 | 5928 | of conveyance |
| 132 | 1 | 6475 | 4.83 | 92.1 | 5961 | of rocks C to |
| 133 | 4 | 6545 | 8.05 | 92.1 | 6028 | No. 2 vehicle |
| 134 | 2 | 6580 | 9.66 | 92.1 | 6062 | |
| 135 | 1 | 6615 | 11.27 | 92.1 | 6096 | |
| 136 | 2 | 6650 | 12.88 | 92.2 | 6129 | |
| 137 | 3 | 6720 | 16.10 | 92.2 | 6196 | |
| 138 | 4 | 6790 | 19.32 | 92.2 | 6264 | |
| 139 | 1 | 6825 | 20.93 | 92.3 | 6297 | |
| 140 | 2 | 6860 | 22.54 | 92.3 | 6331 | |
| 141 | 3 | 6930 | 25.76 | 92.3 | 6398 | |
| 142 | 1 | 6965 | 27.36 | 92.3 | 6432 | |
| 143 | 4 | 7035 | 30.58 | 92.4 | 6499 | |
| 144 | 2 | 7070 | 32.19 | 92.4 | 6532 | |
| 145 | 1 | 7105 | 33.80 | 92.4 | 6566 | |
| 146 | 2 | 7140 | −1.20 | 92.0 | 6568 | dumping of rocks C |
| 147 | 3 | 7210 | 2.02 | 92.0 | 6635 | |
| 148 | 4 | 7280 | 5.24 | 92.1 | 6702 | |

It should be noted that the above table has been prepared for the convenience of easy understanding on the assumption that the respective dumptrucks DT1 to DT4 have a loading capacity which is fixedly set to 35 tons and 70 tons. In practice, since the apparatus in accordance with the illustrated embodiment is so constructed that weight information derived from measurements with the use of the weight meters 21 (see FIG. 1) mounted on the respective dumptrucks DT1 to DT4 are received in the apparatus so as to allow them to be added at every time when collected information are transferred thereto, controlling in relation to a summed quantity of dumped rocks, a required quantity of rocks C, a summed grade of quality and other data is effected more precisely than that in relation to the data shown in the table. Data concerning controlling operations may be printed on a suitable recording medium using a printer attached to the apparatus.

Figure 6:
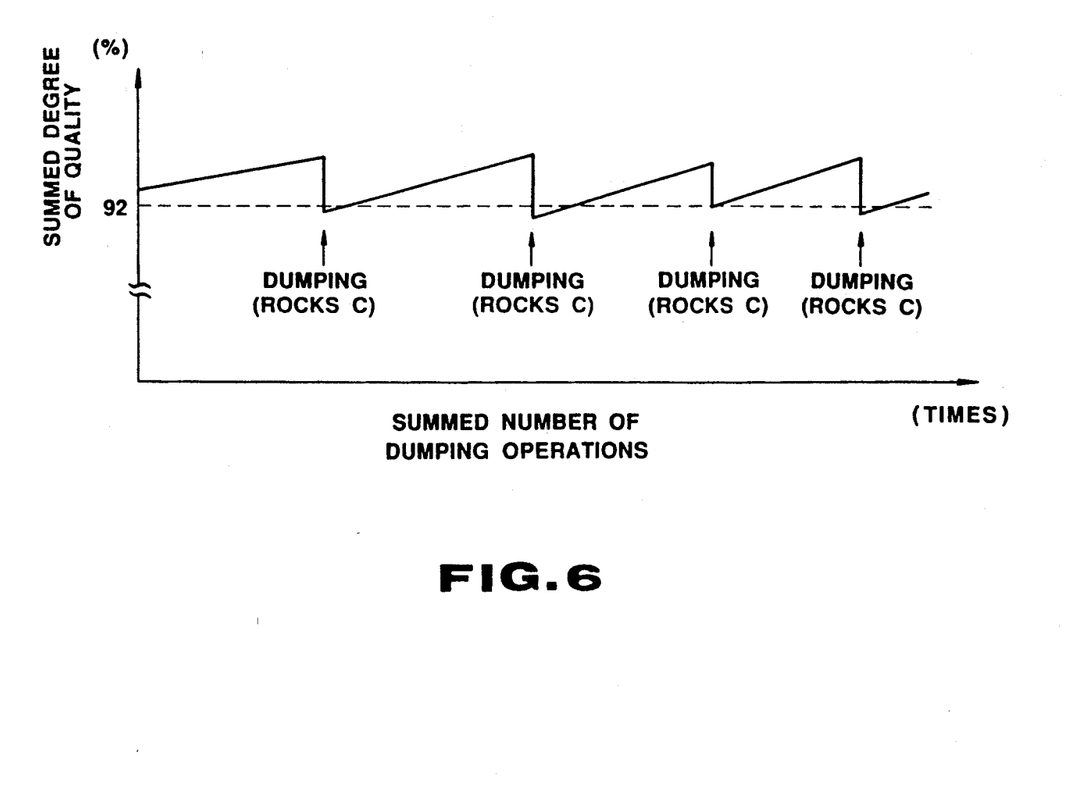
FIG. 6 is a graph schematically illustrating the method of carrying out quality control procedures in accordance with the embodiment of the present invention.

FIG. 6 schematically illustrates by way of graph a method of carrying out a quality control using the data processing unit 40. As is apparent from the drawing, when operations of the respective dumptrucks are adequately determined in accordance with the manner as shown in the drawing, the resultant degree of quality of rocks collected in the shaft HO is satisfactorily main- The above description represents by way of example a manner of controlling a degree of quality of collected rocks on a real time base using the data processing unit 40 in response to collected information transferred from the receiving stations RC. Additionally, the data processing unit 40 controls data concerning a periodic degree of quality of collected rocks, a quantity of the same and a state of operations of the dumptrucks DT (DT1 to DT4) per, e.g., day in unit by centrically reading via the IC card reader 41 information recorded in the IC card 50 via the IC card holder 28 during operations of the dumptrucks DT1 to DT4 after completion of their one days operations.

Here, the IC card 50 refers to a plate-shaped, portable electronic device having a writable/readable semiconductor memory such as RAM or the like incorporated therein. It is fitted to the IC card holder 28 by an operator for his dumptruck when the latter starts its operation (see FIGS. 2, 3, and 4). This permits the following items to be continuously recorded in the IC card 50 at a predetermined time interval depending on the aforementioned functions of the IC card holder 28 as time elapses after the vehicle starts its operation.

(1) movement speed (2) manner of actuation of a vessel (representative of a manner of raising/lowering of the same)
(3) state of operation of an engine
(4) number of revolutions of the engine
(5) magnitude of vibration and stress of chassis and other components
(6) quantity of remaining fuel
(7) quantity of remaining lubricant
(8) level of water in a radiator Additionally, the following information are recorded in the IC card 50 after completion of one operation cycle.
(9) At what time are rocks excavated?
(10) From what pit face are they excavated?
(11) How high grade of quality of rocks are excavated?
(12) How much quantity of rocks are excavated?
(13) To what dumping site are they conveyed?
(14) What is the vehicle number and what is the operator number?

Incidentally, operation data such as vehicle number, operator number and others may of course be recorded per day in unit.

After each dumptruck completes its operation per day in unit, the IC card 50 having a variety of information recorded therein is brought to the control center TM in which it is inserted in the IC card reader 41 (it may be brought thereto by an operator himself or by one of operators who collects their IC cards for them). Then, recorded information are successively read so that they are input into the data processing unit 40 (preferably, after completion of reading, the content of the memory in the IC card is erased).

Thereafter, the recorded information are printed on a suitable printing medium using a printer attached to the data processing unit 40 as they are. Then, they are put in order. Next, the data processing unit 40 executes steps of controlling a periodic degree of quality of collected rocks and a quality of the same (inclusive a step of making a reference to the foregoing control data processed on the real time base), e.g., per day in unit and controlling a state of operations of the respective dumptrucks and a time of maintenance service for them.

Particularly, with respect to the controlling on a state of operations of each dumptruck and a time of maintenance service for the latter, a controlling method as disclosed in a method and apparatus for controlling a construction machine, which patent application was filed by the same applicant as that of the present invention under Japanese Patent Application No. 45,818/1983 is preferably employable.

As will be readily apparent from the above description, the apparatus in accordance with the embodiment of the present invention makes it possible to realize quality control with high accuracy on the real time base without any necessity for preset operation schedule or the like, make a periodic adjustment in connection with the foregoing quality control procedures and easily and rationally carry out controls on operation of each dumptruck.

With this apparatus in accordance with the embodiment of the present invention, pit face information set by and registered in the pit face information setter 10 of each sign post SP and relayed via each dumptruck DT and receiving station RC comprise discriminating information for each pit face and quality information in corresponding to the pit face discriminating information. In case where the quality information can be identified on the basis of the pit face discriminating information, i.e., in case where quality information for each pit face can previously be registered in the data processing unit 40 in correspondence to the discriminating information, only pit face discriminating information may be processed as pit face information. Specifically, in this case, it is assumed that pit face information set by and registered in the pit face information setter 10 and relayed via each dumptruck DT and receiving station RC comprise only discriminating information. The data processing unit 40 automatically takes (reads) quality information on the basis of discriminating information involved in the collected information and then processes them in the above-described manner.

Further, in case where rocks excavated from the respective pit faces are collected in a single shaft, as shown in FIG. 1, it is not always required that dumping site discriminating information indicative of a dumping site are additionally provided for the pit face information. However, such dumping site discriminating information are effective for smoothly controlling rock collection, particularly in case where rocks are simultaneously collected at plural locations.

With respective to the example as shown in FIG. 1, it is assumed for the convenience of easy explanation that rocks A excavated at the pit face M1 and rocks B excavated at the pit face M2 have an identical quality of 96%. In practice, it does not necessarily follow that their degree of quality is identical to each other, although they are the same kind of rocks. When the apparatus in accordance with the embodiment of the present invention is used, the degree of quality of collected rocks can exactly be controlled with high efficiency without any excessive processing load regardless of the facts that rocks have a different degree of quality from site to site and excavated rocks are collected from more pit faces with different degrees of quality.

Further, the method of controlling the degree of quality should not be limited only to the foregoing one (i.e., calculating method) but it may be practiced arbitrarily. For example, the method may of course be practiced in such a manner that the resultant degree of quality derived from whole rocks dumped in a collecting site and a summed quantity of the same are calculated with reference to collected information as well as a summed degree of quality derived from the rocks hitherto collected at the collecting site and a summed quantity of the same, and a degree of quantity of rocks required to be next conveyed so as to maintain a required target degree of quality and a quantity of the rocks to be next conveyed are then obtained on the basis of the degree of quality of rocks and the summed quantity of the same calculated in that way. What is to be done is that the degree of quality of rocks required to be next dumped (conveyed) so as to maintain the required target degree of quality and a quantity of rocks to be dumped (conveyed) are obtained on the basis of the degree of quality of hitherto dumped rocks and the quantity of the same (representative of a quantity of conveyed rocks).

With the apparatus in accordance with the embodiment of the present invention, a number of operation data inclusive vehicle number, operator number and others are set and input by an operator for each vehicle via the operation data setter 22. Alternatively, in case where such operation data can previously be registered in the IC card 50 via the data processing unit 40 in the control center TM (in this case, a reader/writer additionally including a function of writing is used for the IC card reader 41), previously registered operation data may be taken in the monitoring unit 23 via the IC card holder 28 having an IC card 50 fitted thereto. In this case, also a vehicle number information added to the pit face information as a conveyance information via the transferred data control unit 25 is added thereto via the IC card 50, the IC card holder 28 and the monitoring unit 23 automatically (i.e., without any manual inputting into the operation data setter 22) under a condition that the IC card 50 is fitted to the IC card holder 28).

The embodiment of the present invention is illustrated as a preferred example with respect to a case where a degree of quality of limestone rocks usable as raw material for the production of cement is adequately adjusted in accordance with the mining site control process. However, the present invention should not be limited only to this. Alternatively, the present invention may of course be applied with the same advantageous effects as those in the aforementioned embodiment to a case where a required degree of quality should be obtained with other raw material (other ore, clay, sand or the like) by mixing operations performed at excavating sites.

What is claimed is:

1. An apparatus for carrying out a quality control procedure for properly controlling a summed degree of quality of raw material at a specific collecting location to maintain a degree of quality of raw material at said collecting location to a degree of quality of raw material predetermined as a target, said raw material being excavated from a plurality of pit faces and conveyed to said collecting location by a plurality of vehicles, comprising:

pit face information setting means arranged at an excavated raw material loading location in the proximity of each pit face, for registering analyzed information concerning a degree of quality of raw material excavated from said pit face as pit face information, first signal sending means corresponding to each pit face information setting means for sending registered pit face information to a vehicle passage region at the corresponding loading location, first signal receiving means mounted on said vehicle for receiving information sent from said first signal sending means, loaded weight measuring means mounted on said vehicle for automatically measuring a weight of loaded raw material and outputting weight information corresponding to a measured value, conveyance information forming means mounted on said vehicle for integrating the received pit face information and the measured weight information with vehicle discriminating information previously registered with respect to the vehicle to form raw material conveyance information comprising a data set of said received pit face information, said measured weight information and said vehicle discriminating information, second signal sending means mounted on said vehicle for sending the formed raw material conveyance information to the outside of the vehicle, second signal receiving means arranged at said collecting location for receiving information sent from said second signal sending means, collected information forming means arranged at said collecting location for integrating the received raw material conveyance information with discriminating information concerning the collecting location previously registered with respect to the collecting location to form raw material collecting information comprising a data set of said received raw material conveyance information and said discriminating information, first calculating means for successively confirming at least a degree of quality of the collected raw material and a quantity of the same on the basis of the formed raw material collecting information to calculate at least a summed quantity of collected raw material and a summed degree of quality of the same at the raw material collecting location at every time of said confirmation, a portable type IC card including writable/readable storing means, a plurality of sensors arranged on the vehicle for outputting operation information indicative of an operational state of the vehicle as time elapses such as information indicative of an operational state of a conveying operation machine, information indicative of a movement distance and the like information, an IC card holder arranged on the vehicle and configured to freely removably receive said IC card, for transferring to and storing the formed raw material conveyance information in said storing means in the IC card as required and for successively transferring to and storing latched data in said storing means of the IC card while individually latching operation information outputted from respective sensors on the basis of a predetermined time base, and second calculating means including a card reader configured to freely removably receive the IC card for executing a required analyzation on the state representative of operation and movement of each vehicle while successively reading the data stored in the IC card to calculate at least a summed quantity of collected raw material and a summed degree of quality of the same per an arbitrary period of time in unit.

2. An apparatus for carrying out a quality control procedure according to claim 1, wherein the information transmitted between said first signal sending means and said first signal receiving means and the information transmitted between said second signal sending means and said second signal receiving means are conveyed through a medium of an infrared ray.

3. An apparatus for carrying out a quality control procedure according to claim 2, wherein said infrared ray is transmitted with a predetermined directivity in which at least the infrared ray transmitted from said second signal sending means is not received by said first signal receiving means of other vehicle so that said second signal sending means and said first signal receiving means do not interfere with each other when the vehicle passes by or gets ahead of the other vehicle.

4. An apparatus for carrying out a quality control procedure for properly controlling a summed degree of quality of raw material at a specific collecting location to maintain a degree of quality of raw material at said collecting location to a degree of quality of raw material predetermined as a target, said raw material being excavated from a plurality of pit faces and conveyed to said collecting location by a plurality of vehicles, comprising:

pit face information setting means arranged at an excavated raw material loading location in the proximity of each pit face for previously registering as pit face information at least information concerning a degree of quality of raw material excavated from said pit face, said information concerning the degree of quality of raw material being previously analyzed, first signal sending means corresponding to each pit face information setting means for sending corresponding to set pit face information to a vehicle passage region at the corresponding location, first signal receiving means mounted on one of said vehicles for receiving the information sent from said first signal sending means, loaded weight measuring means mounted on the vehicle for automatically measuring the weight of loaded raw material and outputting weight information corresponding to the measured weight, second signal sending means mounted on the vehicle for sending a data set comprising at least the received pit face information and the measured weight information to the outside signal sending means, first calculating means for successively confirming the degree of quality of the collected raw material and the quantity of the collected raw material on the basis of at least the pit face information and the weight information received by said second signal receiving means to calculate in a real time manner at least a summed quantity of the collected raw material and a summed degree of quality of the collected raw material at the raw material collecting location at every time of said confirmation, and second calculating means for calculating in a real time manner a degree of quality and its conveyance quantity of raw material necessary for maintaining a degree of quality of the collected raw material predetermined as a target value on the basis of a result of the first calculation, and radio means for commanding in real time manner the operation of each vehicle on the basis of a result of the second calculation.

5. An apparatus for carrying out a quality control procedure according to claim 4, wherein the information transmitted between said first signal sending means and said first signal receiving means and the information transmitted between said second signal sending means and said second signal receiving means are conveyed through a medium of an infrared ray.

6. An apparatus for carrying out a quality control procedure according to claim 5, wherein said infrared ray is transmitted with a predetermined directivity in which at least the infrared ray transmitted from said second signal sending means is not received by said first signal receiving means of other vehicle so that said second signal sending means and said first signal receiving means do not interfere with each other when the vehicle passes by or gets ahead of the other vehicle.

7. A method of carrying out a quality control procedure for properly controlling the degree of quality of raw material at a specific collecting location to the degree of quality predetermined as a target without requiring previous preparation for operation planning with respect to each of a plurality of vehicles, said raw material being excavated from a plurality of pit faces and then conveyed to said collecting location by the plurality of vehicles, comprising the steps of:

confirming in real time manner the degree of quality of each raw material and a quantity of conveyance of the same at every time when said raw material is conveyed to the collecting location, said degree of quality being previously analyzed with the raw material conveyed from each pit face, determining in real time manner a degree of quality of raw material and a quantity of conveyance of the same on the basis of the confirmed degree of quality and quantity of conveyance, said raw material being next required to be conveyed for maintaining the degree of quality predetermined as a target with respect to the collected raw material, and determining in real time manner an operation mode of each vehicle on the basis of the determined degree of quality and the quantity of conveyance.

8. A method of carrying out a quality control procedure according to claim 7, wherein the control of a summed degree of quality of raw material per an arbitrary global period in time unit is carried out in addition to the control of the degree of the quality of raw material in real time manner, said method further comprising the steps of:

recording for each vehicle at least the information indicative of the degree of quality of the conveyed raw material and the information indicative of the quantity of conveyance of the same together with aging information and identification number information of each vehicle into appropriate recording means in each working cycle, and calculating at least a summed quantity of collected raw material and a summed degree of quality of the same per an arbitrary period of time in unit on the basis of each of said recorded information.

* * * * *